(12) United States Patent
Han et al.

(10) Patent No.: US 6,710,844 B2
(45) Date of Patent: Mar. 23, 2004

(54) METHOD AND APPARATUS FOR ESTIMATING CAMERA MOTION

(75) Inventors: Kyu Seo Han, Daejeon (KR); Byung Tae Chun, Daejeon (KR); Jae Yeon Lee, Daejeon (KR); Jung Soh, Daejeon (KR); Ho Sub Yoon, Daejeon (KR); Se Yoon Jeong, Daejeon (KR); Young Lae Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 231 days.

(21) Appl. No.: 10/029,794

(22) Filed: Dec. 31, 2001

(65) Prior Publication Data

US 2003/0112412 A1 Jun. 19, 2003

(30) Foreign Application Priority Data

Dec. 17, 2001 (KR) .......................... 2001-80123

(51) Int. Cl.$^7$ ........................... G03B 19/18; H04N 7/32
(52) U.S. Cl. ............... 352/44; 375/240.24; 375/240.16
(58) Field of Search ...................... 352/44; 375/240.24, 375/240.16; 382/236; 348/699

(56) References Cited

U.S. PATENT DOCUMENTS 6,266,371 B1 * 7/2001 Kondo ................. 375/240.16

FOREIGN PATENT DOCUMENTS

WO       0042771    7/2000  ............. H04N/7/26

OTHER PUBLICATIONS

M. V. Srinivasan, S. Venkatesh and R. Hosie, Centre for Visual Sciences, Research School of Biological Sciences, Australian National University, "Qualitative Estimation of Camera Motion Parameters from Video Sequences" Pattern Recognition, vol. 30, No. 4, pp. 593–606, 1997.

Kyu–Seo Han, Jae–Yeon Lee, Se–Yoon Jeong, Young–Lae Bae, Electronics and Telecommunication Research Institute, "A Hybrid System for Extracting Camera Motion from Average Projected Image" Proceedings of 2001 Korea Information Processing Society Autumn Annual Meeting, vol. 8, No. 2, pp. 777–780, 2001.

* cited by examiner

*Primary Examiner*—Russel Adams
*Assistant Examiner*—Arthur A Smith
(74) *Attorney, Agent, or Firm*—Jacobson Holman PLLC

(57) ABSTRACT

A method and an apparatus for estimating a camera motion include a frame picture memory unit for storing a plurality of moving picture frames, a buffer for sequentially extracting the frames and storing them, a block division unit for dividing each of the frames stored in the buffer into a plurality of blocks, a mean picture generation unit for generating horizontal and vertical mean pictures using the blocks, a horizontal and a vertical mean picture memory unit for storing the data of the horizontal and vertical mean pictures, a motion vector extraction unit for extracting motion vectors from the blocks using horizontal and vertical mean picture data, a motion vector memory unit for storing the data of the motion vectors, and a camera motion estimation unit for estimating a camera motion using the motion vector data.

12 Claims, 4 Drawing Sheets

METHOD AND APPARATUS FOR ESTIMATING CAMERA MOTION

FIELD OF THE INVENTION

The present invention relates to a method and an apparatus for estimating a camera motion; and, more particularly, to a method and an apparatus for estimating a camera motion, in which the motion of a camera made at the time of photographing can be extracted from a moving picture photographed by the camera to be used for moving picture classification and search.

DESCRIPTION OF THE PRIOR ART

PCT Appln. No. WO 00/42771 discloses "Camera Motion Parameters Estimation Method".

The disclosed camera motion estimation method includes the steps of extracting from a video sequence vectors corresponding to the motion between two successive frames, the motion vectors forming the camera velocity field; pre-processing the camera velocity field so as to reduce the amount of data and the heterogeneousness of the extracted motion vectors; estimating for each pair of frames, from the preprocessed field, camera features between the two considered frames; and undertaking a long term motion analysis based on the estimation in order to obtain motion descriptors corresponding to the estimated camera motion parameters.

The camera motion estimation method constructed as described above is applied to a sequence of successive video frames divided into blocks, and can be employed to implement descriptors within Moving Picture Experts Group (MPEG) 7.

In the estimation method, the extraction of the motion vector is carried out using block matching motion compensation, which is employed as a part of the predictive coding process widely used in video transmission for reducing the amount of information needed to encode a video sequence. To be specific, each frame is divided into a fixed number of blocks, and for each block, a search is made for the most similar block in a previous reference frame, over a predetermined area. The search criterion is generally the search of the best matching block, giving the least prediction error. A motion vector is computed on the basis of the positions of each pair of similar blocks, and a camera parameter between each pair of frames is computed using the computed motion vector and a certain camera motion equation.

As described above, in the conventional camera motion parameter estimation method, a motion vector is extracted by comparing a reference frame with a current frame and a camera motion parameter is estimated using the motion vector. However, the conventional camera motion parameter estimation method has drawbacks in that the speed of parameter estimation is not desirable.

Accordingly, the development of a camera motion parameter estimation method or a camera motion estimation apparatus, which is capable of increasing the speed of estimation, is highly desired.

SUMMARY OF THE INVENTION

It is, therefore, an object of the present invention to provide an apparatus for estimating a camera motion, in which horizontal and vertical mean pictures are generated with respect to each of the blocks of each picture frame throughout the entire picture frames and motion vectors are extracted from the horizontal and vertical mean pictures, thereby increasing the speed of camera motion estimation.

Another object of the present invention is to provide a method for estimating a camera motion, in which a picture frame is divided into a plurality of blocks, horizontal and vertical mean pictures are generated with respect to each block, motion vectors are extracted from the horizontal and vertical mean pictures, and then the camera motion is estimated by the combination of the motion vectors.

In accordance with an aspect of the present invention, there is provided a camera motion estimation apparatus for extracting a camera motion made at the time of photographing from a photographed moving picture, comprising: a frame picture memory unit for storing a plurality of moving picture frames with one frame separated from another; a buffer for sequentially extracting the frames stored in the frame picture memory unit and storing them; a block division unit for dividing each of the frames stored in the buffer into a plurality of blocks; a mean picture generation unit for generating horizontal and vertical mean pictures using the blocks obtained through the block division unit to estimate a camera motion; a horizontal and a vertical mean picture memory unit for storing the data of the horizontal and the vertical mean pictures generated in the mean picture generation unit; a motion vector extraction unit for extracting motion vectors from the blocks using horizontal and vertical mean picture data stored in the horizontal and the vertical mean picture memory unit; a motion vector memory unit for storing the data of the motion vectors extracted in the motion vector extraction unit; and a camera motion estimation unit for estimating a camera motion using the motion vector data stored in the motion vector memory unit.

In accordance with another aspect of the present invention, there is provided a camera motion estimation method of extracting a camera motion made at the time of photographing from a photographed moving picture, comprising the steps of: dividing each of successive frames into a plurality of blocks and generating horizontal and vertical mean pictures with respect to each of the blocks; extracting a representative motion vector with respect to each of the blocks using the horizontal and the vertical mean pictures; estimating a partial camera motion within each of the blocks using the representative motion vector; and estimating the entire camera motion within the moving picture on the basis of the partial camera motions.

BRIEF DESCRIPTION OF THE DRAWINGS

The above and other objects, features and other advantages of the present invention will be more apparently understood from the following detailed description taken in conjunction with the accompanying drawings, in which.

DETAILED DESCRIPTION OF THE PREFERRED EMBODIMENTS

Figure 1:
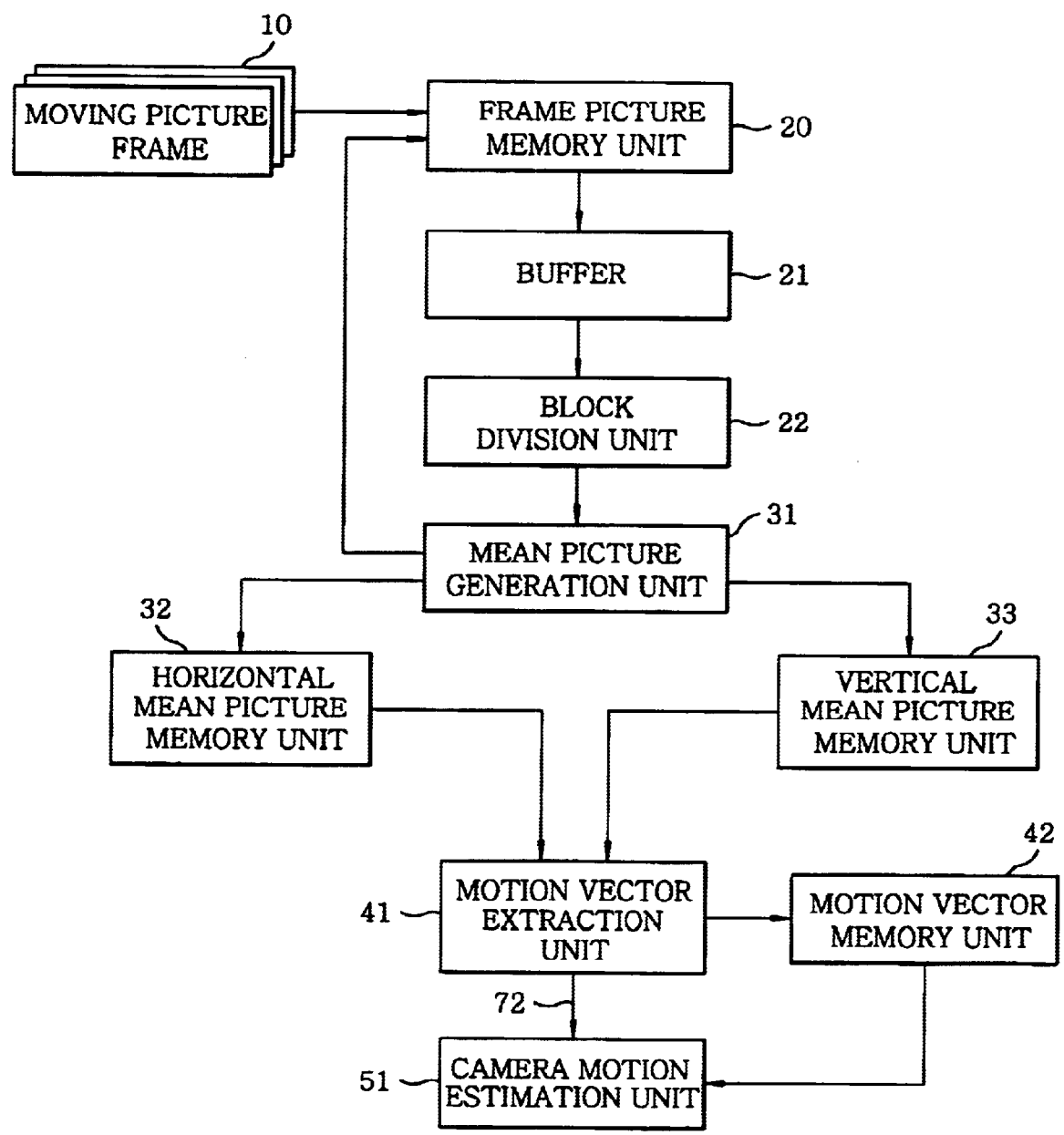
FIG. 1 is a block diagram of an apparatus for estimating a camera motion in accordance with the present invention.

As shown in FIG. 1, an apparatus for estimating a camera motion in accordance with the present invention includes a frame picture memory unit 20 for storing a plurality of moving picture frames 10 with one frame separated from another, a buffer 21 for sequentially extracting the frames stored in the frame picture memory unit 20 and storing them, a block division unit 22 for dividing each of the frames stored in the buffer 21 into a plurality of blocks, a mean picture generation unit 31 for generating horizontal and vertical mean pictures using the blocks obtained in the block division unit 22 to estimate a camera motion, a horizontal and a vertical mean picture memory unit 32 and 33 for storing data of the horizontal and vertical mean pictures generated in the mean picture generation unit 31, a motion vector extraction unit 41 for extracting motion vectors from the blocks using horizontal and vertical mean picture data stored in the horizontal and the vertical mean picture memory unit 32 and 33, a motion vector memory unit 42 for storing the data of the motion vectors extracted in the motion vector extraction unit 41, and a camera motion estimation unit 51 for estimating a camera motion using the motion vector data stored in the motion vector memory unit 42.

The motion estimation process that is performed by the camera motion estimation apparatus is described hereinafter.

A plurality of moving picture frames 10 are sequentially stored in the frame picture memory unit 20.

When the moving picture frames stored in the frame picture memory unit 20 are color picture frames, the color picture frames are converted into gray scale picture frames and stored in the buffer 21.

The gray scale picture frames stored in the buffer 21 are each divided into a plurality of blocks having a uniform size by the block division unit 22. Each of the blocks is m in width and n in length. The magnitudes of the width and length should be smaller than those of each frame, respectively. Generally, the block has a size of m=n=8.

Figure 2:
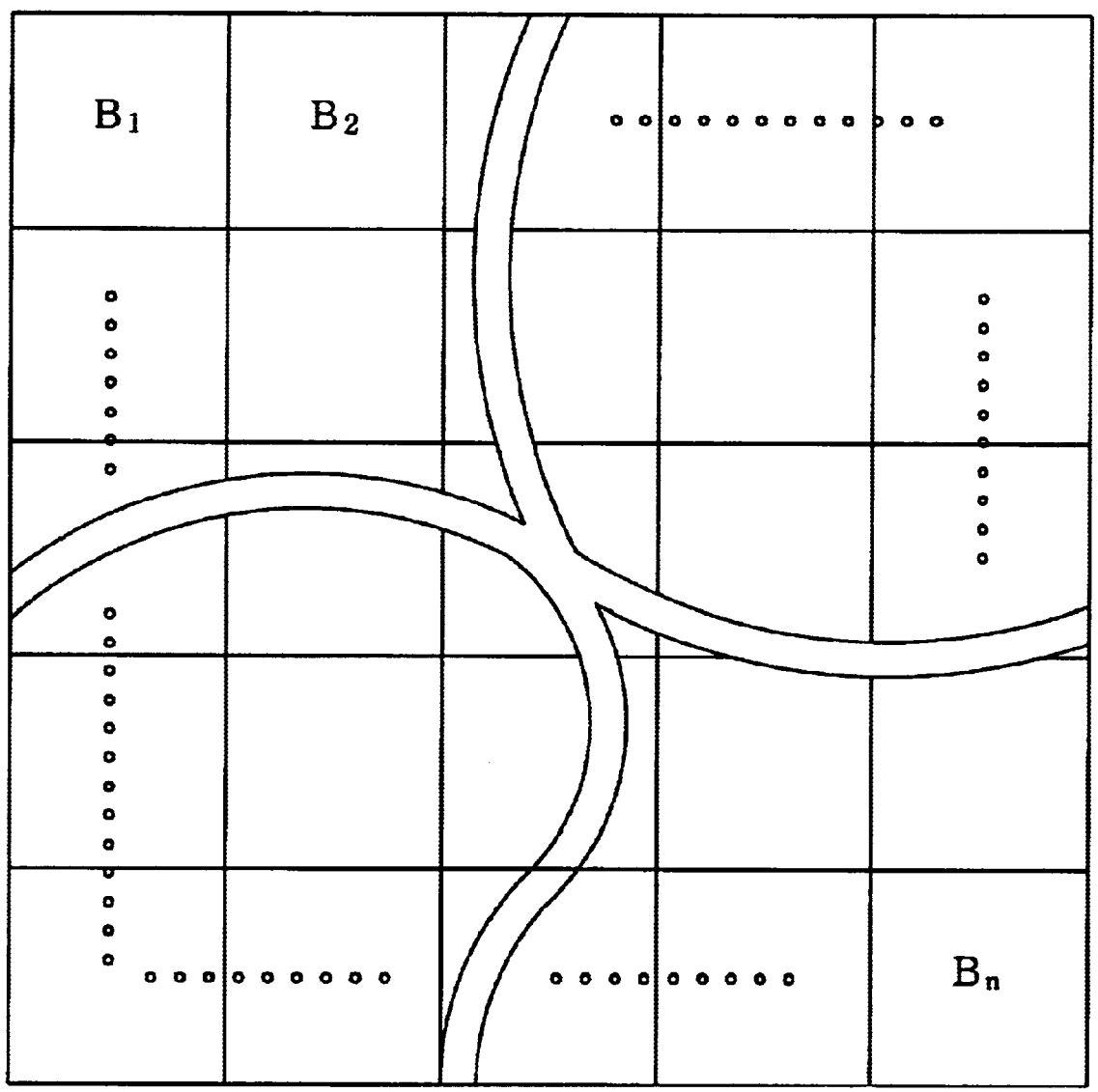
FIG. 2 is a view for showing a divided picture frame.

The gray scale picture frames divided into the subblocks by the block division unit 22 are sequentially transmitted to the mean picture generation unit 31. As shown in FIG. 2, each of the gray scale picture frames is divided into the blocks $B_1$ to $B_n$, and the blocks $B_1$ to $B_n$ are transmitted to the mean picture generation unit 31.

The mean picture generation unit 31 generates horizontal and vertical mean pictures using each of the transmitted blocks.

Figure 3:
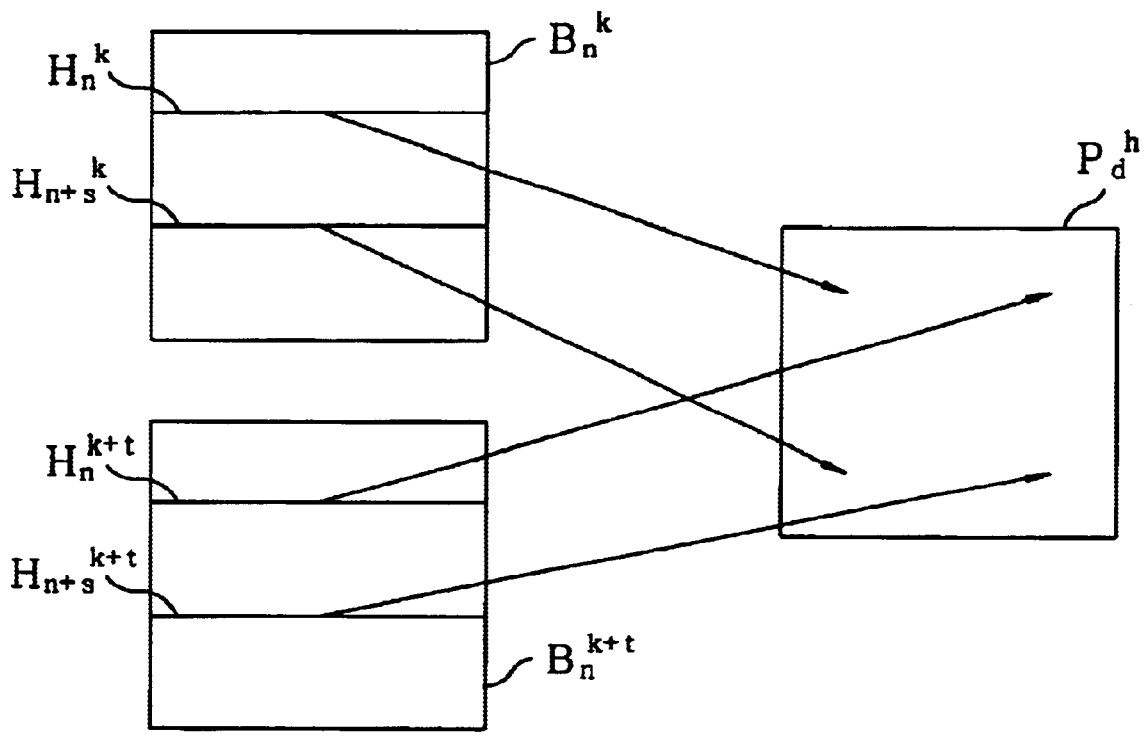
FIG. 3 is a view for showing the generation of horizontal and vertical mean pictures.
Figure 3:
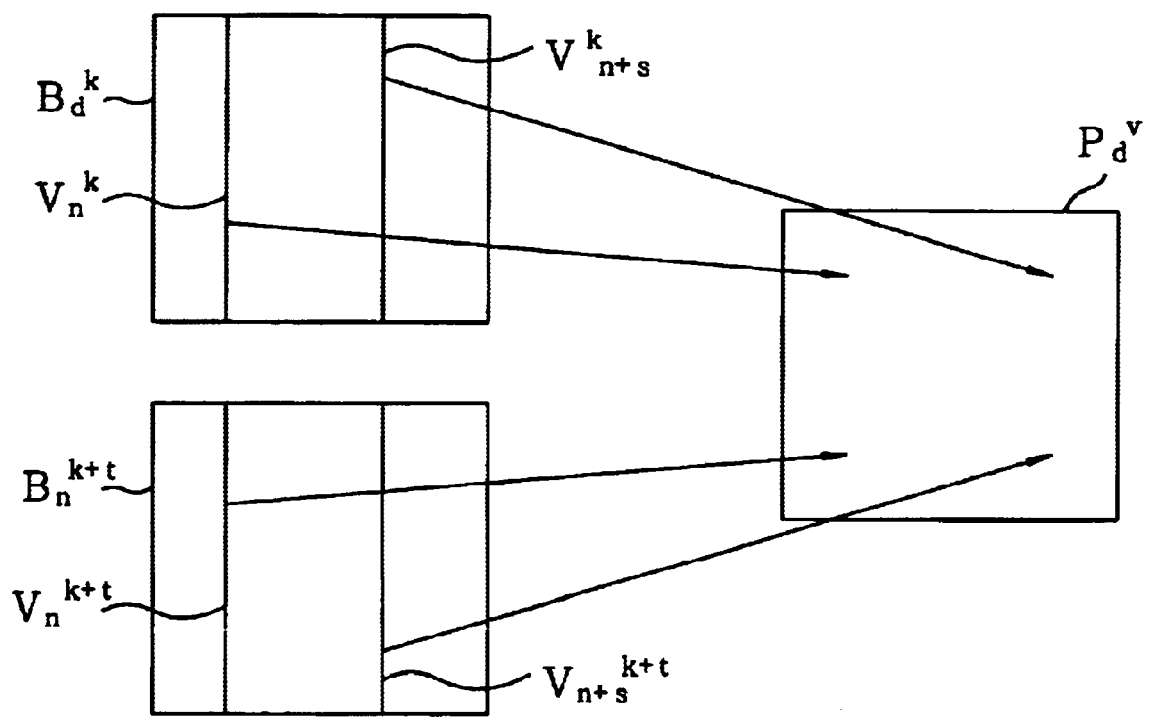

The horizontal and vertical mean pictures are generated as shown in FIG. 3. With reference to FIG. 3, a mean picture generation method is described.

Each block has 8 pixels in width and 8 pixels in length. $B_d^k$ denotes the d-th block of a k-th frame, and $H_n^k$ denotes the n-th horizontal line of the d-th block of a k-th frame.

The total mean value of a horizontal line $H_n^k$ is mapped to the point (k,n) of a horizontal mean picture $P_d^h$ of each block, while the total mean value of a vertical line $V_n^k$ is mapped to the point (k,n) of a vertical mean picture $P_d^v$ of each block. Such a mapping is carried out according to equation 1.

$$P_d^h(k, l) = \frac{1}{m}\sum_{i=1}^{m} B_d^k(i, l) \quad (1)$$

$$P_d^v(k, l) = \frac{1}{n}\sum_{j=1}^{n} B_d^l(k, j)$$

The horizontal mean picture generated in the mean picture generation unit 31 is stored in the horizontal mean picture memory unit 32. Similarly, the vertical mean picture is stored in the vertical mean picture memory unit 33.

When processing of a frame is completed, the mean picture generation unit 31 transmits a request signal for the next frame. The frame picture memory unit 20 receives and stores the next frame in response to the request signal for the next frame. The above-described process is repeated until processing of the final frame is completed. In this case, the horizontal and the vertical mean picture memory unit 32 and 33 hold the data of the previous pictures until processing of the final frame is completed.

The motion vector extraction unit 41 extracts a motion vector with respect to each block using the horizontal and vertical mean pictures stored in the horizontal and vertical mean memory unit 32 and 33. The motion vectors extracted are stored in the motion vector memory unit 42. When extraction of motion vectors with respect to all the frames is completed, the motion vector extraction unit 41 transmits a motion vector extraction completion signal to the camera motion estimation unit 51. At this time, the camera motion estimation unit 51 estimates a camera motion using motion vectors with respect to the frames stored in the motion vector memory unit 42.

Figure 4:
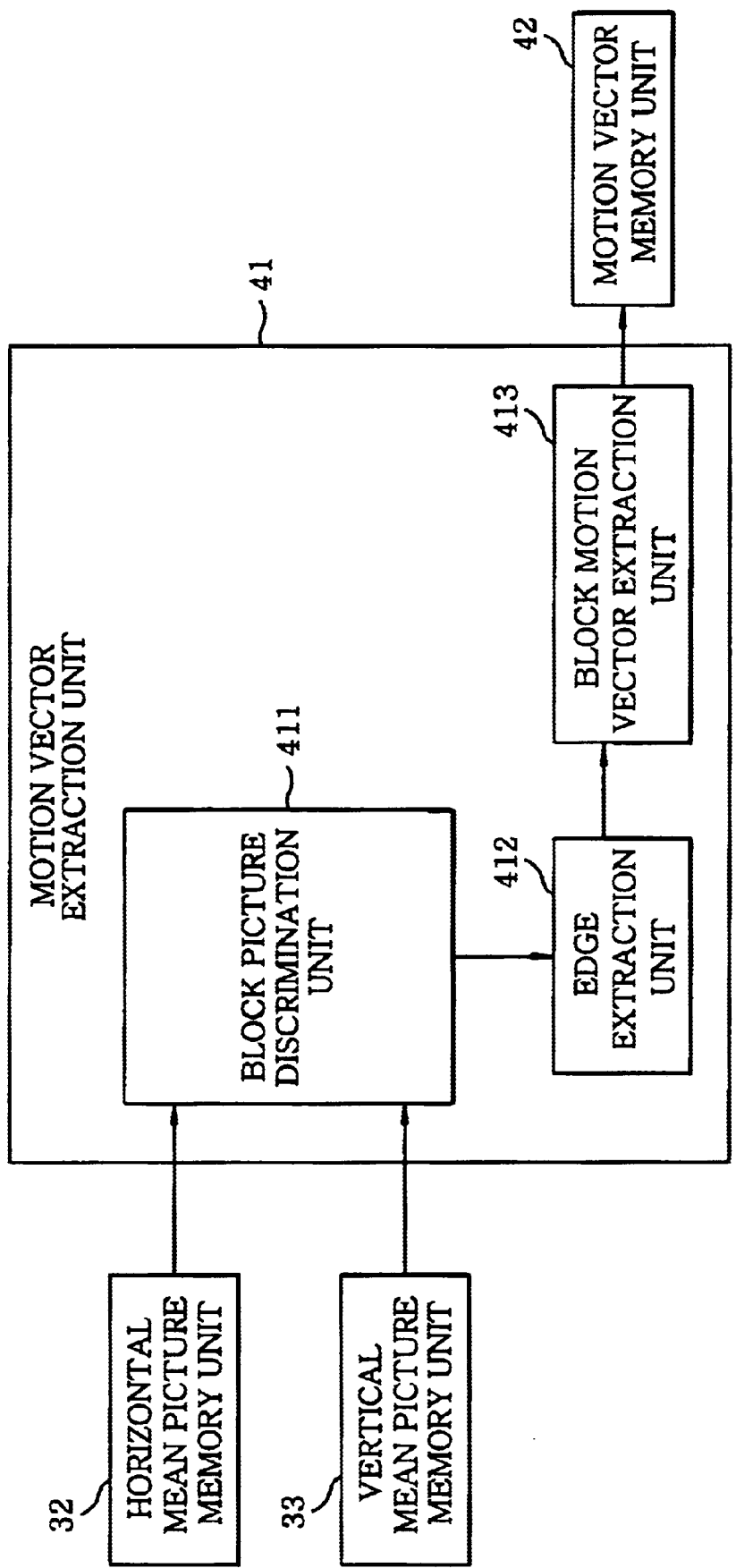
FIG. 4 is a view showing the motion vector extraction unit of the camera motion estimation apparatus according to the present invention.

The motion vector extraction unit 41, as depicted in FIG. 4, includes a block picture discrimination unit 411, an edge extraction unit 412, and a block motion vector extraction unit 413.

The block picture discrimination unit 411 converts data transmitted from the horizontal and the vertical mean picture memory unit 32 and 33 into block pictures.

The edge extraction unit 412 extracts edge components from the block pictures using the block pictures converted in the block picture discrimination unit 411. The extracted edge components include a magnitude component and a direction component.

The block motion vector extraction unit 413 extracts the motion vector of each block picture from the edge components extracted through the edge extraction unit 412. A number of edge components can be extracted by the edge extraction unit 412. The block motion vector extraction unit 413 compares a plurality of edge components with one another and assigns a representative value for the motion vector of the block picture.

In the comparison of edge components, a plurality of edge components are compared with one another, and edge components having a magnitude component equal to or smaller than a certain reference value are removed. The reference value can be determined by a user. Then, the direction components of the remaining edge components are arranged and a direction component of the highest frequency is assigned for a representative direction component. Then, the motion vector extraction unit 41 stores the representative component in the motion vector memory unit 42.

The camera motion estimation unit 51 extracts a camera motion using the motion vectors extracted in the motion vector extraction unit 41. In detail, the camera motion estimation unit 51 receives the representative direction components of the blocks, and estimates the camera motion using the representative direction components. In this case, the representative components used as input values are temporal direction components due to the characteristics of block pictures.

Spatial direction components are required to extract the camera motion, so that the representative direction components are converted into spatial direction components. When T is the total number of frames, this conversion is carried out according to Equation 2.

$$x_d = T/\tan \theta_{v,d} \qquad (2)$$

$$y_d = T^* \tan \theta_{h,d}$$

The spatial movement speeds $u_x$ and $u_y$ are obtained using the movement values $x_d$ and $y_d$ in x and y-axis directions obtained through Equation 2 and the center position values $x_o$ and $y_o$ of the blocks. Where the position values of each block are $x_o$ and $y_o$, $u_x = x_o - x_d$ and $u_y = y_o - y_d$. The camera motions $R_x$, $R_y$ and $R_{zoom}$ are calculated by substituting the spatial movement speeds $u_x$ and $u_y$ and the center position values $x_o$ and $y_o$ for $u_x$, $u_y$, x and y of Equation 3, respectively.

$$u_x = \frac{xy}{f} R_x - f\left(1 + \frac{x^2}{f^2}\right) R_y + f\tan^{-1}\left(\frac{x}{f}\right)\left(1 + \frac{x^2}{f^2}\right) R_{zoom} \qquad (3)$$

$$u_y = -\frac{xy}{f} R_y - f\left(1 + \frac{x^2}{f^2}\right) R_x + f\tan^{-1}\left(\frac{y}{f}\right)\left(1 + \frac{y^2}{f^2}\right) R_{zoom}$$

wherein $f$ is set to 1.

Camera motion parameters $R_x$, $R_y$ and $R_{zoom}$ obtained for each block through Equation 3 are compared with one another, and then the parameter of the greatest value is assigned for the representative camera motion of the block to thereby assign a representative camera motion of the highest frequency for the camera motion of a current moving picture.

As described above, the camera motion made at the time when a moving picture was photographed can be extracted from the moving picture. The extracted camera motion is utilized as a parameter for moving picture classification and search.

As described above, the present invention provides a method for estimating a camera motion, in which a picture frame is divided into a plurality of blocks, horizontal and vertical mean pictures are generated with respect to each block, motion vectors are extracted from the horizontal and vertical mean pictures, and then the camera motion is estimated by the combination of the motion vectors.

While the present invention has been shown and described with respect to the preferred embodiments, it will be understood by those skilled in the art that various changes and modifications may be made without departing from the spirit and scope of the present invention as defined in the following claims.

What is claimed is:

1. A camera motion estimation apparatus for extracting a camera motion made at the time of photographing from a photographed moving picture, comprising:
   a frame picture memory unit for storing a plurality of moving picture frames with one frame separated from another;
   a buffer for sequentially extracting the frames stored in the frame picture memory unit and storing them;
   a block division unit for dividing each of the frames stored in the buffer into a plurality of blocks;
   a mean picture generation unit for generating horizontal and vertical mean pictures using the blocks obtained through the block division unit to estimate a camera motion;
   a horizontal and a vertical mean picture memory unit for storing data of the horizontal and the vertical mean pictures generated in the mean picture generation unit;
   a motion vector extraction unit for extracting motion vectors from the blocks using the horizontal and the vertical mean picture data stored in the horizontal and the vertical mean picture memory unit;
   a motion vector memory unit for storing data of the motion vectors extracted in the motion vector extraction unit; and
   a camera motion estimation unit for estimating a camera motion using the motion vector data stored in the motion vector memory unit.

2. The apparatus according to claim 1, wherein, if said moving picture frames stored in said frame picture memory unit are color picture frames, said moving picture frames are converted into gray scale picture frames and the gray scale picture frames are stored in the buffer.

3. The apparatus according to claim 1, wherein said motion vector extraction unit comprises:
   a block picture discrimination unit for converting data transmitted from the horizontal and the vertical mean picture memory unit into block pictures;
   an edge extraction unit for extracting edge components from the block pictures using the block pictures converted in the block picture discrimination unit; and
   a block motion vector extraction unit for extracting a motion vector of each of the block pictures from the edge components extracted through the edge extraction unit.

4. The apparatus according to claim 3, wherein said edge components extracted in the edge extraction unit includes a magnitude component and a direction component.

5. The apparatus according to claim 3, wherein said edge extraction unit can extract a number of edge components, and said block motion vector extraction unit compares the edge components with one another to thereby assign a representative value for a motion vector of the block picture.

6. The apparatus according to claim 5, wherein said block motion vector extraction unit removes edge components having a magnitude component equal to or smaller than a predetermined reference value by comparing the extracted edge components with one another to thereby assign a direction component of the highest frequency for a representative component of each block by arranging the direction components of remaining edge components of the extracted edge components.

7. The apparatus according to claim 1, wherein said camera motion estimation unit receives representative direction components of the blocks to thereby estimate the camera motion using the representative direction components.

8. The apparatus according to claim 7, wherein said representative components are temporal direction components due to characteristics of the block pictures.

9. A camera motion estimation method of extracting a camera motion made at the time of photographing from a photographed moving picture, comprising the steps of:
   dividing each of successive frames into a plurality of blocks to generate a horizontal and a vertical mean picture with respect to each of the blocks;
   extracting a representative motion vector with respect to each of the blocks using the horizontal and the vertical mean picture;
   estimating a partial camera motion within each of the blocks using the representative motion vectors; and
   estimating an entire camera motion within the moving picture on the basis of the partial camera motions.

10. The method according to claim 9, wherein said mean picture generation step includes the steps of mapping a mean value of each horizontal line to a point of a horizontal mean picture of each block, and mapping a mean value of a vertical line to a point of a vertical mean picture of each block.

11. The method according to claim 9, wherein said partial camera motion estimation step includes the step of converting the representative motion vectors into spatial direction vectors with the number of the frames taken into consideration so as to remove temporal movement components from the representative motion vectors.

12. The method according to claim 9, wherein said entire camera motion estimation step comprises the substeps of collecting partial camera motions with respect to the blocks and assigning a camera motion of the highest frequency for the representative camera motion.

\* \* \* \* \*